(12) United States Patent
Schroeder

(10) Patent No.: US 6,400,142 B1
(45) Date of Patent: Jun. 4, 2002

(54) STEERING WHEEL POSITION SENSOR

(75) Inventor: Thaddeus Schroeder, Rochester Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/386,877

(22) Filed: Aug. 31, 1999

(51) Int. Cl.[7] ................................................ G01B 7/14
(52) U.S. Cl. .............................. 324/207.21; 324/207.25
(58) Field of Search ........................ 324/207.2, 207.21, 324/207.22, 207.23, 207.24, 207.25; 338/32 H, 32 R; 123/617; 180/400

(56) References Cited

U.S. PATENT DOCUMENTS

| | | | | |
|---|---|---|---|---|
| 4,835,467 A | | 5/1989 | Gokhale ..................... 324/166 |
| 4,914,389 A | * | 4/1990 | Juds ....................... 324/207.21 |
| 4,926,122 A | | 5/1990 | Schroeder et al. ..... 324/207.13 |
| 4,939,456 A | | 7/1990 | Morelli et al. ......... 324/207.21 |
| 5,004,981 A | * | 4/1991 | Hashimoto et al. .... 324/207.22 |
| 5,570,016 A | | 10/1996 | Schroeder et al. ..... 324/207.25 |
| 5,602,681 A | * | 2/1997 | Nakayama et al. .... 324/207.21 |
| 5,714,883 A | | 2/1998 | Schroeder et al. ..... 324/207.25 |
| 5,731,702 A | | 3/1998 | Schroeder et al. ..... 324/207.21 |
| 5,754,042 A | | 5/1998 | Schroeder et al. ..... 324/207.25 |
| 6,018,241 A | * | 1/2000 | White et al. ............. 324/207.2 |

FOREIGN PATENT DOCUMENTS

| | | |
|---|---|---|
| DE | 35 23 162 | 1/1986 |
| DE | 198 34 868 | 2/2000 |

* cited by examiner

Primary Examiner—Jay Patidar
(74) Attorney, Agent, or Firm—Margaret A. Dobrowitsky

(57) ABSTRACT

A method and apparatus for sensing absolute rotative position of a steering wheel. A short section (10) of the steering shaft (12) is threaded and threadably engaged with a nut. The nut includes a sliding bar (16) which carries a magnetic irregularity (18, 18'). A sensor assembly (22) includes a galvanomagnetic sensor (30) mounted within a stationary channel (20). The channel receivably guides axial movement of the sliding bar as the steering shaft is rotated. Since the rotation of the steering shaft translates to axial movement of the sliding bar, and since the galvanomagnetic sensor has an electrical output indicative of axial position of the magnetic irregularity, the exact rotative position of the steering wheel is known from the output of the galvanomagnetic sensor.

4 Claims, 3 Drawing Sheets

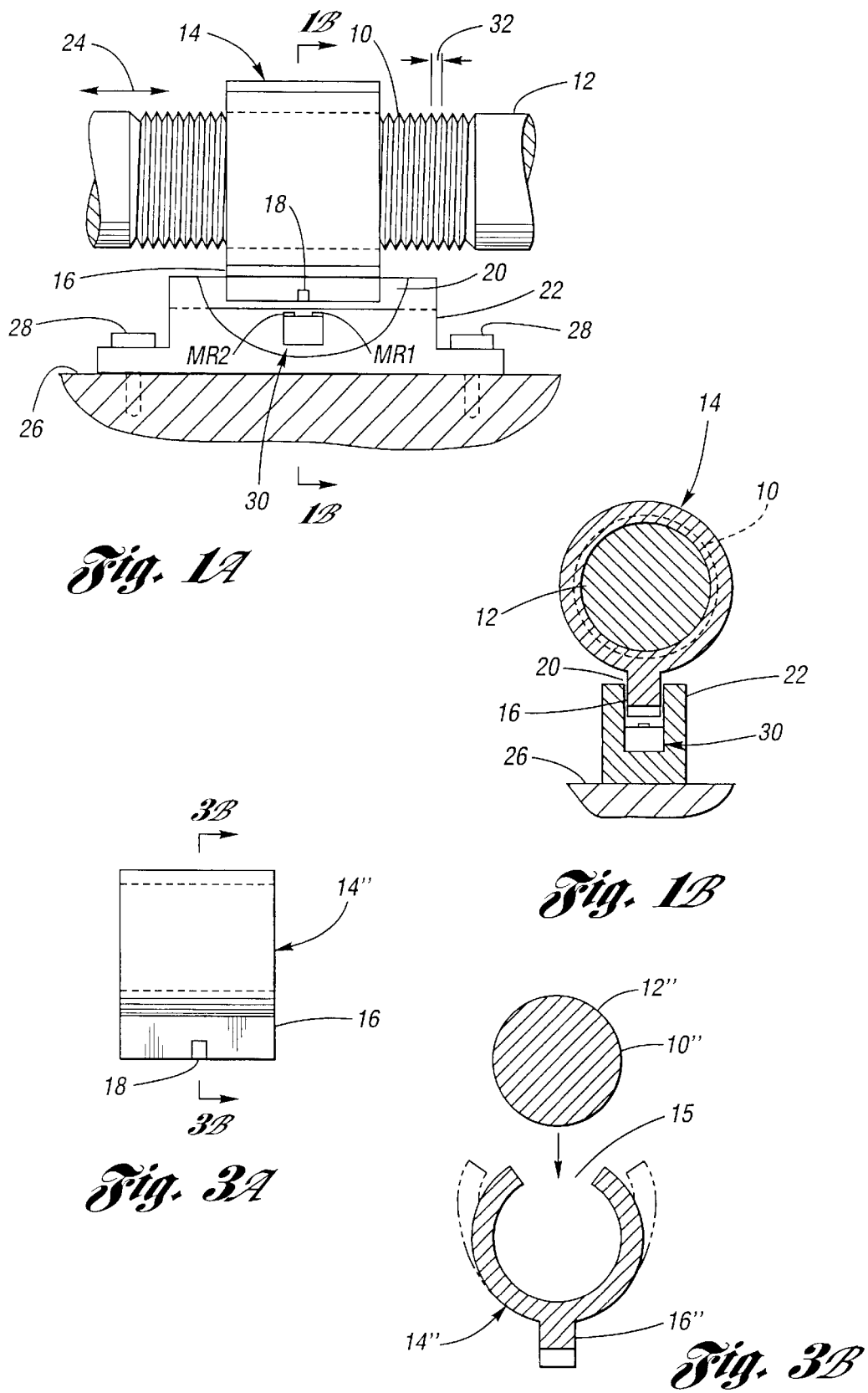

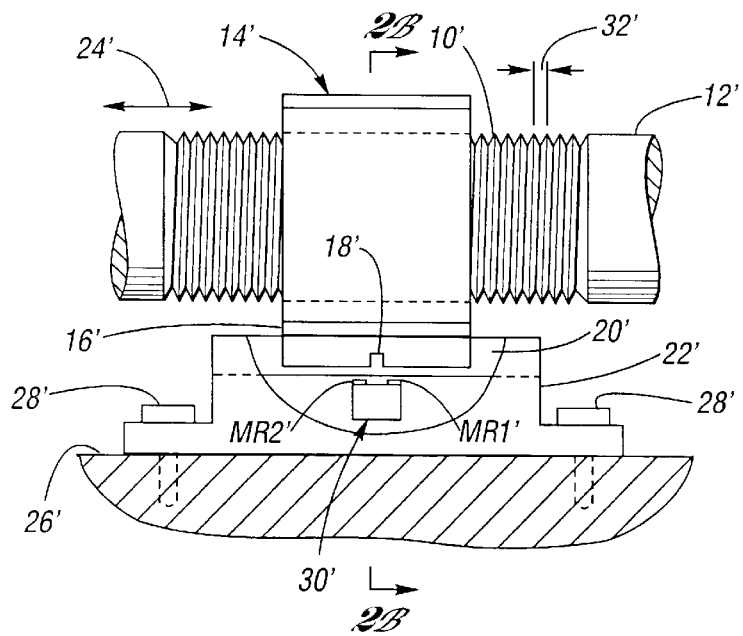
Fig. 2A
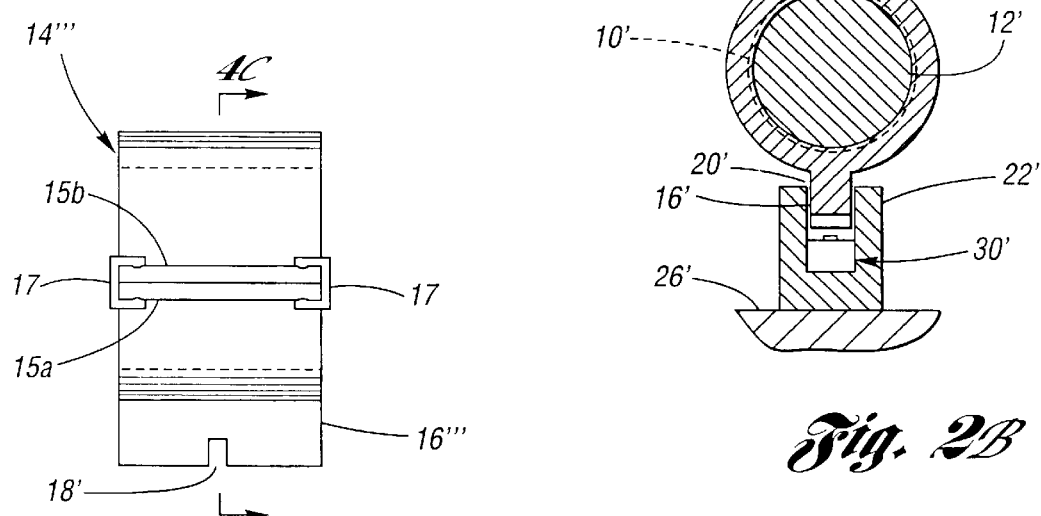
Fig. 2B
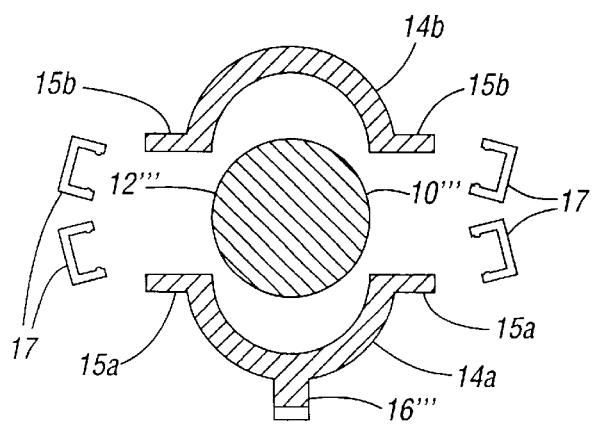
Fig. 4A
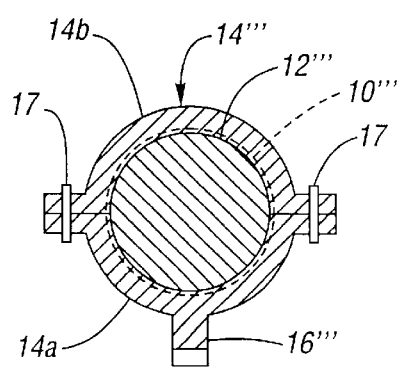
Fig. 4B
Fig. 4C

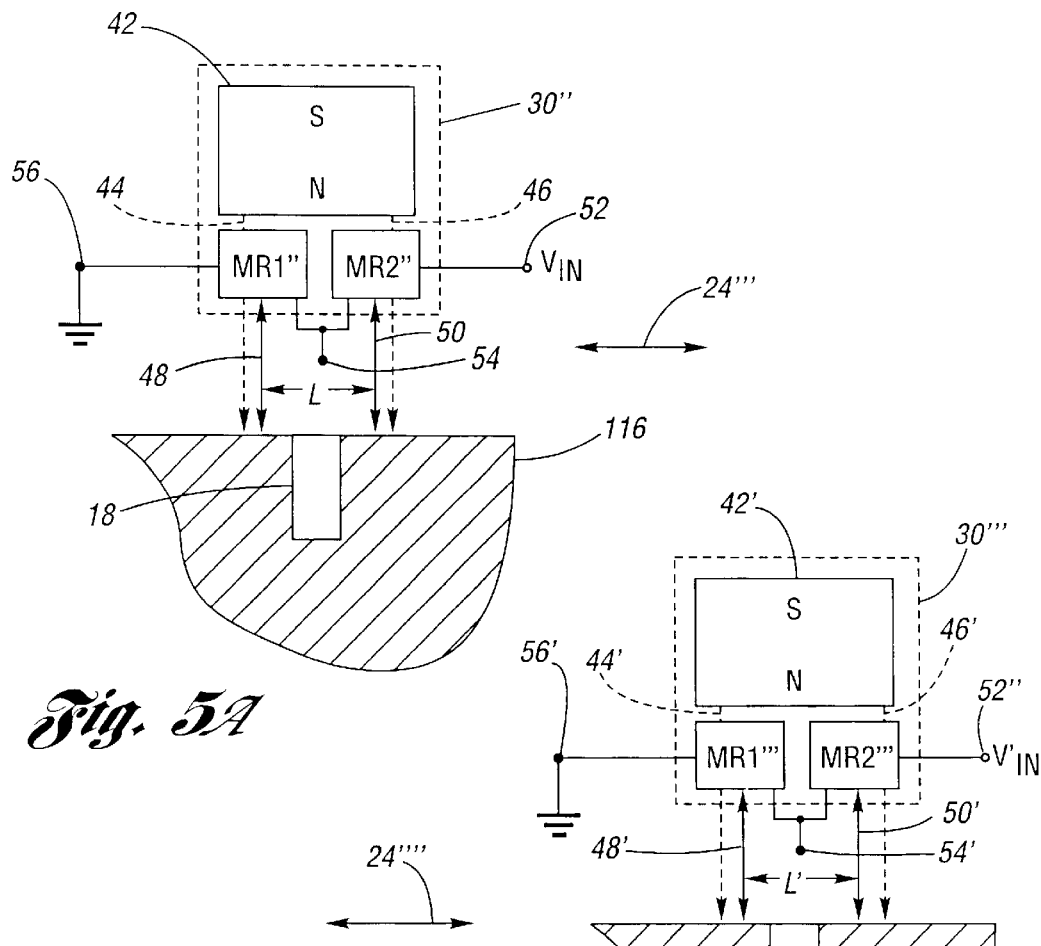
Fig. 5A
Fig. 5B
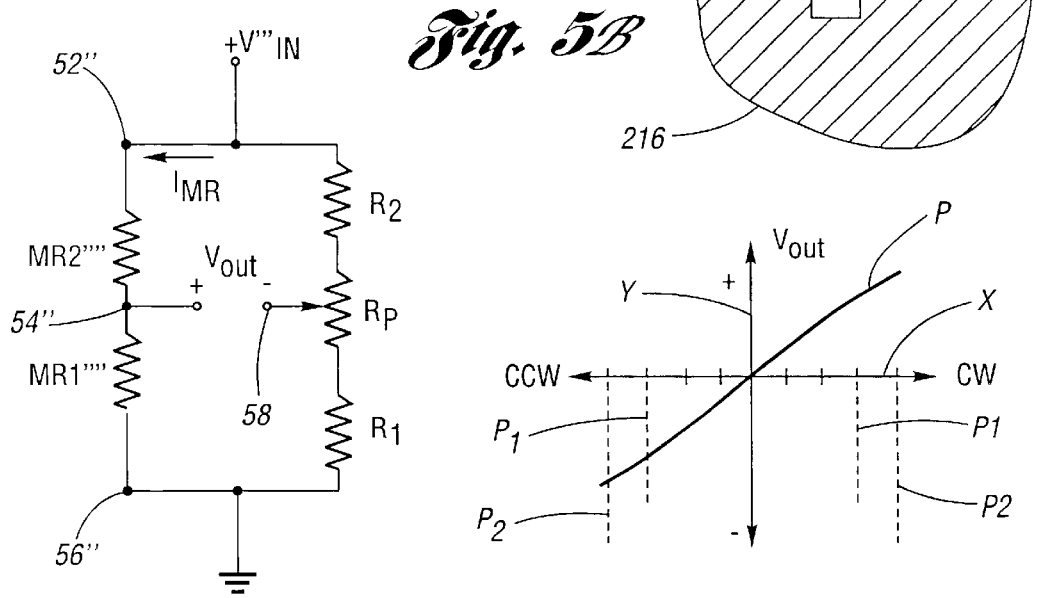
Fig. 6A
Fig. 6B

STEERING WHEEL POSITION SENSOR

TECHNICAL FIELD

The present invention relates to a method of position sensing and more particularly to a method for sensing steering wheel position.

BACKGROUND OF THE INVENTION

It is well known in the art that the voltage modulation of Hall elements or resistance modulation of magnetoresistors can be employed in position and speed sensors with respect to moving magnetic materials or objects (see for example U.S. Pat. Nos. 4,835,467, 4,926,122, and 4,939,456). In such applications, the magnetoresistor (MR) is biased with a magnetic field and electrically excited, typically, with a constant current source or a constant voltage source. A magnetic (i.e., ferromagnetic) object moving relative and in close proximity to the MR, such as a tooth, produces a varying magnetic flux density through the MR, which, in turn, varies the resistance of the MR. The MR will have a higher magnetic flux density and a higher resistance when a tooth is adjacent to the MR than when a tooth is at a distance from the MR.

Increasingly more sophisticated spark timing and emission controls introduced the need for crankshaft sensors capable of providing precise position information during cranking. Various combinations of magnetoresistors and single and dual track toothed or slotted wheels (also known as encoder wheels and target wheels) have been used to obtain this information (see for example U.S. Pat. Nos. 5,570,016, 5,714,883, 5,731,702, and 5,754,042).

The crank position information is encoded on a rotating target wheel in the form of teeth and slots. Virtually all such sensors are of the magnetic type, either variable reluctance or galvanomagnetic (e.g. Hall generators or magnetoresistors). Galvanomagnetic sensors are becoming progressively most preferred due to their capability of greater encoding flexibility and speed independent output signals.

High accuracy and repeatability magnetic position sensors employ two matched sensing elements such as magnetoresistors (MR) or Hall generators. They are spaced a few mm apart from each other. The primary purpose of using two matched sensing elements is common mode signal rejection, since the sensing elements are equally affected by temperature and air gap.

In addition, Electric Power Steering (EPS) controls need to know the absolute position of the steering wheel at all times, including the instant of powering on the system. The steering wheel can be rotated three full revolutions in each direction. However, the specifications call for the sensor itself to have a minimum capability of several full rotations in each direction. Present sensors are incapable of recognizing multiple revolutions, and must be augmented by software. The position learning algorithm requires time to figure out the steering wheel position, and it is incapable of recognizing position at power on. A simple and inexpensive non-contact absolute steering wheel position sensor, even with only a moderate resolution, would be highly desirable.

What is needed is a method and apparatus wherein a simple and inexpensive non-contact sensor, even with only a moderate resolution, gives absolute steering wheel position at all times.

SUMMARY OF THE INVENTION

The present invention provides a method and apparatus wherein a single dual element galvanomagnetic sensor, herein exemplified by a single dual element magnetoresistive (MR) sensor, is incorporated to sense absolute steering wheel position from the position of a magnetic irregularity, such as for example a ferromagnetic tooth or a slot in a ferromagnetic material, with respect to the stationary MR sensor.

Such a steering wheel sensor can be constructed by threading a short section of the steering shaft and placing a threaded article, for example a nut with a matching thread, into threaded engagement with the threaded section. The nut is prevented from rotating by means of a sliding bar attached to the nut which is received within a guiding channel of a stationary MR sensor assembly such that the nut is enabled to move axially with respect to the stationary MR sensor. The sliding bar is fitted with a ferromagnetic tooth or the sliding bar is, itself, ferromagnetic and has a slot. The axial direction of movement is such that it is along a line joining the centers of the two MR elements of the single dual element MR sensor (i.e. MR sensor).

Thus, the rotation of the steering wheel is translated into a precisely repeatable axial movement of the nut, and, as a consequence, a precisely repeatable axial movement of the tooth or slot with respect to the stationary MR sensor. And, since the resistance of the MR elements of the MR sensor are responsive to magnetic field intensity changes, the output of the MR sensor is related to the axial position of the nut with respect to the MR sensor.

For example, one full revolution of the steering wheel could vary the axial position of the nut by one thread pitch. The edge of the sliding bar has a slot or tooth which is sensed by the MR. The output of the MR sensor, with proper circuit design, indicates the position of the tooth (or the slot) with respect to the stationary MR sensor, and, hence, data pertaining to the net rotation of the steering wheel, be that clockwise (CW) or counterclockwise (CCW). If desired, this MR sensor could be packaged as one sensing system together with a torque sensor.

For simplicity of installation, the nut could be designed in a way which would permit mounting it by transverse placement onto the steering shaft without the necessity of a free end. One possible approach is the use of a nut consisting of two separate halves. These halves can be easily connected by means of clips. Alternatively, the nut could be manufactured from a resilient material (e.g. spring steel or polymer) with a cut-out to permit the threaded section of the steering shaft to be forced through the cut-out via a resilient (and temporary) deformation of the nut and thereby allow placement onto the threaded section.

Accordingly, it is an object of the present invention to provide a method and apparatus wherein a single dual element galvanomagnetic sensor, herein exemplified by a single dual element magnetoresistive sensor, is incorporated to sense absolute steering wheel position from the position of a tooth or a slot with respect to a galvanomagnetic sensor.

This, and additional objects, advantages, features, and benefits of the present invention will become apparent from the following specification.

BRIEF DESCRIPTION OF THE DRAWINGS

FIG. 1A is a partially sectional side view depicting an example of a preferred environment of use of a dual MR position sensor according to the present invention, wherein the sliding bar contains a tooth.

FIG. 1B is a cross-sectional view, seen along line 1B—1B of FIG. 1A.

FIG. 2A is a partly sectional side view depicting an example of a preferred environment of use of a dual MR position sensor according to the present invention, wherein the sliding bar contains a slot.

FIG. 2B is a cross-sectional view, seen along line 2B—2B of FIG. 2A.

FIG. 3A is a side view of a nut, wherein the nut is resiliently elastic with a cut-out and the sliding bar contains a tooth.

FIG. 3B is a partly sectional view, seen along line 3B—3B of FIG. 3A.

FIG. 4A is a side view of a nut, wherein the nut is diametrically split and the sliding bar contains a slot.

FIG. 4B is an exploded view of the nut of FIG. 4A.

FIG. 4C is a partly sectional view, seen along line 4C—4C of FIG. 4A.

FIG. 5A is a partly sectional side view of an MR sensor according to the present invention, wherein the sliding bar contains a tooth embedded in a non-magnetic material.

FIG. 5B is a partly sectional side view of an MR sensor according to the present invention, wherein the sliding bar contains a slot.

FIG. 6A is a schematic view of a circuit for an MR sensor according to the present invention.

FIG. 6B depicts a plot of output voltage of the circuit of FIG. 6A versus steering wheel rotative position according to the present invention.

DESCRIPTION OF THE PREFERRED EMBODIMENT

Referring now to the Drawing, FIG. 1A depicts a threaded 10 section of a steering shaft 12 upon which a nut 14 with matching threads is threadably engaged. The nut 14 is prevented from rotating along with the steering shaft by means of a sliding bar 16 attached to the nut which is guidably received by a guiding channel 20 so as to be slidable therein. The guiding channel 20 is stationary, in that it forms a part of an MR sensor assembly 22 which is mounted to a stationary surface 26 (of the vehicle) via fasteners 28. The sliding bar 16 carries in this view a ferromagnetic tooth 18.

As the nut threads along the threaded section 10, the sliding bar 16 moves guidably by the guiding channel 20 in an axial direction 24 with respect to the MR sensor assembly. The MR sensor assembly 22 incorporates, by way of example, a single dual element MR sensor 30 consisting of MR1 and MR2.

Accordingly, when a driver rotates the steering wheel, rotation of the steering shaft 12 is translated into a highly repeatable axial movement 24 of the nut 14, and, consequently, of the tooth 18 with respect to the MR sensor 30. Since the voltage output from the MR sensor 30 is sensitive to magnetic variation, the axial position of the nut with respect to the MR sensor is related to the magnitude of the voltage output from MR sensor. Indeed, the voltage is uniquely valued for any axial position of the tooth, whether caused by a clockwise (CW) or a counterclockwise (CCW) rotation of the steering shaft 12 (that is, of the steering wheel).

For example, one full revolution of the steering shaft 12 could vary the axial position 24 of the tooth 18 by one thread pitch 32. The axial movement 24 of the tooth 18 is sensed by the MR sensor 30 whose voltage output, with proper circuit design, indicates the position of the tooth with respect to the MR sensor (to be described later) whereby the absolute rotational position of the steering shaft 12 is known.

FIG. 1B depicts a view of the cross section of FIG. 1A, showing the guiding channel 20 constraining the sliding bar 16 to move in the axial direction 24.

FIG. 2A depicts a threaded section 10' of a steering shaft 12' upon which a nut 14' with matching threads is threadably engaged. The nut 14' is prevented from rotating by means of a sliding bar 16', attached to the nut, which is now ferromagnetic and fitted with a slot 18'. The sliding bar 16' is constrained within a guiding channel 20' which forms a part of a stationary MR sensor assembly 22' such that the nut is guided to be movable only in an axial direction 24' with respect to the MR sensor assembly. The MR sensor assembly 22' is immovably mounted on a stationary surface 26' (relative to the vehicle) with fasteners 28' and incorporates a single dual element MR sensor 30' consisting of MR1' and MR2'. The rotation of the steering shaft 12' is translated into a highly repeatable axial movement 24' of the nut 14', and, consequently, of the slot 18' with respect to the MR sensor 30'. Since the voltage output from the MR sensor 30' is sensitive to magnetic variation, the axial position of the nut with respect to the MR sensor is related to the magnitude of the voltage output from MR sensor. Indeed, the voltage is uniquely valued for any axial position of the tooth, whether caused by a clockwise (CW) or a counterclockwise (CCW) rotation of the steering shaft 12' (that is, of the steering wheel).

For example, one full revolution of the steering shaft 12' could vary the axial position 24' of the slot 18' by one thread pitch 32'. The axial movement 24' of the slot 18' is sensed by the MR sensor 30' whose output, with proper circuit design, indicates the position of the slot with respect to the MR sensor (to be described later), whereby the absolute rotational position of the steering shaft 12' is known.

FIG. 2B depicts a view of the cross section of FIG. 2A, showing the guiding channel 20' constraining the sliding bar 16' to move in the axial direction 24'.

While the above examples of a nut 14, 14' involve the nut being threaded onto the threaded section 10, 10' via a free end of the steering shaft, it is desirable to modify the nut so that it may be transversely placed onto the threaded section without need of a free end of the steering shaft, examples of which being shown in FIGS. 3A through 4C.

FIGS. 3A and 3b depict a nut 14" having a cut-out 15. The nut 14" is composed of a resilient material, for example spring steel or a polymer, with the cut-out 15 (shown in FIG. 3B) being sized smaller than the cross-section of the threaded section 10" of a steering shaft 12", so that the steering wheel shaft must be forced therethrough via a resilient and temporary deformation of the nut (see phantom lines in FIG. 3B). When so forced, the threaded section 10" becomes threadably engaged with the threads of the nut 14". While the sliding bar 16" is shown having a tooth 18, a slot may be used in the alternative (in which case the sliding bar is ferromagnetic). This nut configuration allows the nut 14" to be assembled onto the threaded section 10" of the steering wheel shaft 12" after installation of the steering wheel shaft.

FIGS. 4A through 4C depict views of a nut 14''' which is diametrically split into a first nut component 14a and a second nut component 14b, each having a pair of first and second flanges 15a, 15b, respectively. The first nut component 14a includes a sliding bar 16''' that is ferromagnetic and contains a slot 18' (as shown), or alternatively is non-ferromagnetic and contains a tooth. This nut configuration allows the nut 14''' to be assembled onto the threaded section 10 of a steering wheel shaft 12 after installation of the steering wheel shaft. U-shaped clips 17 snap onto and compressibly hold first and second flanges 15a, 15b of the first and second nut components 14a, 14b together, so that the nut 14''' is kept in threaded engagement with a threaded section 10''' of a steering wheel shaft 12'''. The sliding bar 16''' is guided so as to allow only axial movement in a guiding channel of a stationary MR sensor assembly, as previously described.

Other equally preferred structural configurations for transversely placing the nut onto the threaded section are possible. For example, in a modification of the configuration of FIGS. 4A through 4C a hinge connects the first and second nut components, and an oppositely positioned flange of each nut component is held by clips. In yet another variation, the sliding bar is integrated with at least one of the flanges.

FIG. 5A depicts the magnetic biasing and electrical connections of a single dual element MR sensor 30'', analogous to the single dual element MR sensor 30 of FIG. 1A or to the single dual element MR sensor 30' of FIG. 2A, according to the present invention, wherein the sliding bar 116 of a nut (not shown) is threadably engaged with a threaded section of a steering wheel shaft (not shown) as described hereinabove. The sliding bar 116 is non-ferromagnetic and contains a tooth 18 constrained to move in the axial direction 24''' of the steering wheel shaft.

The single dual element MR sensor 30'' employs two magnetoresistor elements, MR1'' and MR2'', which are mutually spaced a distance L and are biased by a permanent magnet 42, wherein the magnetic flux 44 and 46 emanating therefrom is represented by the dashed arrows. The magnetic flux 44 and 46 passes from the permanent magnet 42 through the magnetoresistors MR1'' and MR2'' and through the air gaps 48 and 50 to the sliding bar 116. Power is supplied to MR1'' and MR2'' through voltage source $V_{IN}$ at terminal 52 of MR2''. Terminal 54, connecting MR1'' and MR2'', is a first terminal for the output (the second terminal for the output will be described later). Terminal 56 of MR1''' is connected to ground.

As previously mentioned, the axial movement 24''' of the tooth 18 is sensed by the MR sensor 30'' whose output, with proper circuit design, indicates the position of the tooth 18 with respect to the MR sensor (to be described later) whereby the absolute rotational position of the steering shaft (which is analogous to the steering shaft of FIG. 1A) is known.

FIG. 5B depicts the magnetic biasing and electrical connections of a single dual element MR sensor 30''', analogous to the single dual element MR sensor 30'' of FIG. 5A, wherein the sliding bar 216 of a nut is, itself, ferromagnetic and contains a slot 18', wherein the sliding bar is constrained to move in the axial direction 24'''' of a steering wheel shaft, analogous to the depiction at FIG. 2A.

The single dual element MR sensor 30''' employs two magnetoresistor elements, MR1''' and MR2''', which are mutually spaced a distance L' and are biased by a permanent magnet 42', wherein the magnetic flux 44' and 46' emanating therefrom is represented by the dashed arrows. The magnetic flux 44' and 46' passes from the permanent magnet 42' through the magnetoresistors MR1''' and MR2''' and through the air gaps 48' and 50' to the sliding bar 216. Power is supplied to MR1''' and MR2''' through voltage source $V'_{IN}$ at terminal 52' of MR2'''. Terminal 54', connecting MR1''' and MR2''', is a first terminal for the output (the second terminal for the output will be described later). Terminal 56' of MR1''' is connected to ground.

As previously mentioned, the axial movement 24'''' of the slot 18' is sensed by the sensor 30''' whose output, with proper circuit design, indicates the position of the slot with respect to the MR sensor (to be described later) whereby the absolute rotational position of the steering shaft, analogous to the steering shaft 12' of FIG. 2A, is known.

It is well known in the art that the resistance of an MR element can be modulated by a varying magnetic flux density through the MR element, which, in turn, varies the resistance of the MR element ($R_{MR}$) whereby a higher magnetic flux density through the MR element increases the resistance of the MR element and a lower magnetic flux density through the MR element decreases the resistance of the MR element. The portions of MR elements under a ferromagnetic material are exposed to a considerably higher magnetic field than the portions of MR elements not under the ferromagnetic material (i.e. slots). In a single dual element MR sensor, the areas of the MR elements are essentially the same. Thus, the more area of one MR element covered by a ferromagnetic material, the greater the resistance of that MR element or the more area of one MR element covered by a slot, the less the resistance of that MR element.

When the centerline of a ferromagnetic material, or a slot therein, coincides with the center line of the MR sensor, which is aligned midway between the MR elements, the areas of both MR elements covered by the ferromagnetic material or the slot are equal and, thus, the resistance of one MR element ($R_{MR1}$) is the same as the resistance of the other MR element ($R_{MR2}$), since the two MR elements are matched. Once the ferromagnetic material or slot is moved along a line joining the centers of the two MR elements (i.e., in the axial direction in the context of the present invention), then the centerline of the ferromagnetic material or slot does not coincide with the centerline of the MR sensor. The area of one MR element covered by the ferromagnetic material or slot is then less than the area of the other MR element covered by the ferromagnetic material or slot, thereby causing the resistance of one MR element to increase while the resistance of the other MR element decreases. Since the resistance of each MR element is proportional to the area covered by the ferromagnetic material, or slot therein, and the area covered is proportional to the position of the ferromagnetic material or slot, the output voltage of a properly designed circuit can be made to be directly proportional to the position of a ferromagnetic tooth or slot in a ferromagnetic article, as well. A properly designed electrical circuit can incorporate this change in resistance and produce an output voltage which is a linear function of the position of the tooth or slot.

Such a circuit depicting the electrical operation of FIG. 5A or 5B is shown in FIG. 6A. Terminal 52'' of MR2'''' is connected to the positive terminal of a constant voltage source $V'''_{in}$, whereas terminal 56'' of MR1'''' is connected to ground. Resistors R1 and R2 have, preferably, but not necessarily, the same value. $V_{out}$ is measured with respect to terminals 54'' and 58 with terminal 58 considered to be at the reference potential. Terminal 58 is also the terminal of a variable resistor $R_P$ by which the resistance between terminal 58 and ground or between terminal 58 and $V'''_{in}$ can be varied. The resistance between terminal 58 and ground or between terminal 58 and $V'''_{in}$ is adjusted such that $V_{out}$ is zero at some initial rotative position of the steering wheel, preferably, but not necessarily, when the steering wheel is at such a rotative position that the wheels are parallel to the vehicle (i.e. the straight ahead position).

With the aforementioned initial condition, $V_{out}$ can be expressed in terms of the current $I_{MR}$ (passing through MR1'''' and MR2'''') and the resistance of MR1'''' ($R_{MR1''''}$)

as: $V_{out}=(I_{MR})(R_{MR1''''}-R_{MR0})$ where $I_{MR}=V'''_{in}/(R_{MR2''''}+R_{MR1''''})$ and $R_{MR0}$ is the value of $R_{MR1''''}$ when $V_{out}$ is zero, wherein $R_{MR0}=R_{MR2''''}\times(R_1/R_2)$. The movement of the tooth 18 or the slot 18' in the axial direction increases the resistance of one MR and decreases the resistance of the other MR. However, since the MRs are matched, the magnitude of the increase of the resistance of one MR is the same as the magnitude of the decrease in resistance of the other MR, thereby causing the total resistance $R_{MR2''''}+R_{MR1''''}$ to remain relatively constant, whereby the current $I_{MR}$ also remains constant.

Thus, the output voltage, $V_{out}$, is directly proportional to the difference in resistance between $R_{MR1''''}$ and $R_{MR0}$ and, therefore, the change in $V_{out}$ is directly proportional to the change in resistance of MR1''''. Since the resistance of each MR is proportional to the area covered by the tooth 18 or slot 18' and the area covered is proportional to the position of the tooth or the slot relative to the MR sensor, the output voltage, $V_{out}$, is directly proportional to the position of the tooth or the slot as well.

FIG. 6B depicts a plot P of output voltage ($V_{out}$) of the circuitry of FIG. 6A (Y axis) versus steering wheel rotative position in increments of whole turns (X axis), both for clockwise (CW) rotation and counterclockwise (CCW) rotation, according to the present invention. As shown in FIG. 6B, each value of $V_{out}$ along the plot P corresponds to a unique rotative position of the steering wheel and, therefore, the present invention senses absolute steering wheel rotative position from the position of a tooth or slot with respect to the MR sensor. In this plot P, the MR sensor is able to sense a range of rotation exceeding the mechanical limit of the steering shaft. For example, where three rotations of the steering shaft are the mechanical limit ($P_1$), the MR sensor has the ability to sense four rotations ($P_2$).

It is to be understood that while a magnetoresistor (MR) was exemplified in the foregoing detailed description of a preferred embodiment of the present invention, other analogous sensing elements, such as hall elements my be utilized, the class of such sensors being inclusively denoted as galvanomagnetic elements. It is to be further understood that while a nut has been described as being threadably engaged with the threaded section of a steering shaft, any article threaded with the threaded section which is capable of providing an axial component of movement in response to rotation of the steering shaft is substitutable for the nut.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A steering wheel position sensor comprising:

a mounting member;

a steering shaft having a threaded section, said steering shaft being rotatable with respect to a mounting member;

a nut threadably engaged with said threaded section, said nut axially moving in response to rotation of said steering shaft, said steering shaft having a predetermined range of rotative positions, wherein said predetermined range of rotative positions correspond to a range of axial positions of said nut;

a sliding bar connected to said nut;

a magnetic irregularity located at said sliding bar;

channel means connected with said mounting member for guiding said sliding bar so as to constrain said sliding bar to move axially as said steering shaft rotates relative to said nut; and galvanomagnetic sensor means connected to said mounting member for providing an electrical signal indicative of the axial position of said nut with in response to axial movement of said sliding bar; said galvanomagnetic sensor means comprising a dual element magnetoresistive sensor comprising:

a first magnetoresistor element;

a second magnetoresistor element adjacent said first magnetoresistor element; and a biasing magnet stationarily affixed with respect to said first and second magnetoresistor elements, said biasing magnet providing a biasing magnetic field which passes through said first and second magnetoresistor elements, the biasing magnetic field having a range of values at said first and second magnetoresistor elements responsive to the axial movement of said magnetic irregularity.

2. The steering wheel position sensor of claim 1, further comprising means for threadably engaging said nut onto said threaded section by transverse placement of said nut onto said steering shaft.

3. The steering wheel position sensor of claim 1, wherein said magnetic irregularity comprises at least one ferromagnetic tooth connected with said nut.

4. The steering wheel position sensor of claim 1, wherein said magnetic irregularity comprises at least one slot formed in a ferromagnetic material connected with said nut.

* * * * *